(12) United States Patent
Mori et al.

(10) Patent No.: US 11,010,115 B2
(45) Date of Patent: May 18, 2021

(54) IMAGE PROCESSING APPARATUS CAPABLE OF EXCLUSIVELY SETTING MULTIPLE SETTINGS, METHOD THEREFOR, AND STORAGE MEDIUM

(71) Applicant: CANON KABUSHIKI KAISHA, Tokyo (JP)

(72) Inventors: Junichi Mori, Toride (JP); Aya Kasahara, Tokyo (JP); Masaki Kashiwagi, Hiratsuka (JP); Satoshi Totsuka, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/261,914

(22) Filed: Jan. 30, 2019

(65) Prior Publication Data

US 2019/0235812 A1    Aug. 1, 2019

(30) Foreign Application Priority Data

Feb. 1, 2018   (JP) .............................. JP2018-016745

(51) Int. Cl.
*G06F 3/12* (2006.01)
(52) U.S. Cl.
CPC .......... *G06F 3/1263* (2013.01); *G06F 3/1205* (2013.01); *G06F 3/1253* (2013.01); *G06F 3/1276* (2013.01); *G06F 3/1286* (2013.01)
(58) Field of Classification Search
USPC ................................ 358/1.1–3.29, 1.11–1.18
See application file for complete search history.

(56) References Cited

U.S. PATENT DOCUMENTS

| | | | |
|---|---|---|---|
| 9,606,753 B2* | 3/2017 | Itami | G06F 3/1205 |
| 2006/0050307 A1* | 3/2006 | Koike | H04N 1/00002 |
| | | | 358/1.15 |
| 2007/0201071 A1* | 8/2007 | Yamada | G06F 3/1205 |
| | | | 358/1.13 |
| 2009/0278531 A1* | 11/2009 | Franke | H02P 6/17 |
| | | | 324/207.2 |

(Continued)

FOREIGN PATENT DOCUMENTS

| | | |
|---|---|---|
| JP | 2000229460 A | 8/2000 |
| JP | 2000351254 A | 12/2000 |
| JP | 2004284258 A | 10/2004 |

*Primary Examiner* — Marcellus J Augustin
(74) *Attorney, Agent, or Firm* — Rossi, Kimms & McDowell LLP

(57) ABSTRACT

An image processing apparatus capable of, even both of reservation printing and pre-printing paper sheet confirmation are set for one print job, preventing a printing process from substantially being halted due to a confliction between these two settings. The image processing apparatus is capable of generating a print job, a time request and a print medium confirmation request. The image processing apparatus performs: a first process, which exclusively generates one of the time request and the print medium confirmation request, generates the print job including the generated one request, and performs a process corresponding to the generated one request prior to printing based on the print job; or a second process, which generates the time request and the print medium confirmation request, generates both of the two request, and exclusively performs one of the two requests prior to printing based on the print job.

5 Claims, 19 Drawing Sheets

(56) References Cited

U.S. PATENT DOCUMENTS

| | | | |
|---|---|---|---|
| 2011/0261382 A1* | 10/2011 | Koura | G06F 3/1208 |
| | | | 358/1.13 |
| 2013/0322946 A1* | 12/2013 | Okada | B41J 13/0036 |
| | | | 400/582 |
| 2014/0376023 A1* | 12/2014 | Anno | G06K 15/4065 |
| | | | 358/1.14 |
| 2015/0138596 A1* | 5/2015 | Kikuchi | G06F 3/1203 |
| | | | 358/1.15 |

* cited by examiner

FIG. 4A

| 41 | 42 | 43 | 44 | 45 |
|---|---|---|---|---|
| BASIC SETTING | PAGE SETTING | FINISHING | PAPER FEEDING | PRINTING QUALITY |

OUTPUT METHOD: RESERVATION PRINTING ▽

PRINTING
RESERVATION
PRINTING — 46

NUMBER OF COPIES: 1 (1~9999)

PRINTING ORIENTATION
⦿ PORTRAIT  ◯ LANDSCAPE

SCALE: 100 % (25~200)

RESERVATION TIME: 22:50 — 47

[OK] [CANCEL]

| 41 | 42 | 43 | 44 | 45 |
|---|---|---|---|---|
| BASIC SETTING | PAGE SETTING | FINISHING | PAPER FEEDING | PRINTING QUALITY |

PAPER FEEDING:
MANUAL FEEDING
CASSETTE 1
CASSETTE 2
CASSETTE 3 — 51

52 — ☑ CONFIRM PAPER SHEET BEFORE PRINTING

CHARACTER STRING TO BE DISPLAYED: SET COATED PAPER IN MANUAL FEEDING TRAY — 53

[OK] [CANCEL]

| | | |
|---|---|---|
| PRINT JOB NAME | zzz.doc | 61 |
| USER ID | mori | 62 |
| OUTPUT METHOD | RESERVATION PRINTING | 63 |
| RESERVATION TIME | 22:50 | 64 |
| PRINT SETTING | NUMBER OF COPIES=10, PAPER FEEDING=MANUAL FEEDING TRAY, ... | 65 |
| PRE-PRINTING PAPER SHEET CONFIRMATION | ON | 66 |
| CHARACTER STRING TO BE DISPLAYED | SET COATED PAPER IN MANUAL FEEDING TRAY | 67 |
| PRINTING DATA | (PDL DATA) | 68 |

FIG. 11

| RECEPTION DATE AND TIME | USER ID | PRINT JOB NAME | OUTPUT METHOD | RESERVATION TIME | STORAGE PLACE |
|---|---|---|---|---|---|
| 2017/06/03 9:00 | Kaneko | AAA.txt | RESERVATION PRINTING | 2017/06/04/02:00 | /data/Kaneko/doc1 |
| 2017/06/03 9:05 | Sato | BBB.pdf | RESERVATION PRINTING | 2017/06/04/03:00 | /data/Sato/doc1 |
| 2017/06/03 10:00 | Kaneko | CCC.doc | RESERVATION PRINTING | 2017/06/04/03:30 | /data/Kaneko/doc2 |
| 2017/06/03 10:00 | Kaneko | DDD.doc | RESERVATION PRINTING | 2017/06/04/03:40 | /data/Kaneko/doc3 |
| 2017/06/03 11:00 | Suzuki | EEE.doc | RESERVATION PRINTING | 2017/06/04/04:00 | /data/Suzuki/doc1 |
| 2017/06/03 12:00 | Suzuki | FFF.doc | RESERVATION PRINTING | 2017/06/04/04:30 | /data/Suzuki/doc2 |

IMAGE PROCESSING APPARATUS CAPABLE OF EXCLUSIVELY SETTING MULTIPLE SETTINGS, METHOD THEREFOR, AND STORAGE MEDIUM

BACKGROUND OF THE INVENTION

Field of the Invention

The present invention relates to an image processing apparatus capable of exclusively setting multiple settings, a method therefor, and a storage medium.

Description of the Related Art

In Japanese Laid-Open Patent Publication (Kokai) No. 2000-351254, a print job including a time request for starting printing at a specified time is generated in an information processing terminal, the generated print job is transmitted to an image forming apparatus, and the image forming apparatus performs printing by executing the print job at the specified time.

In each of Japanese Laid-Open Patent Publication (Kokai) No. 2000-229460 and Japanese Laid-Open Patent Publication (Kokai) No. 2004-284258, a print job including a request for user's paper sheet confirmation is generated in an information processing terminal, the generated print job is transmitted to an image forming apparatus, and the image forming apparatus performs printing by executing the print job after the user's paper sheet confirmation is processed.

As described above, some image processing apparatuses, such as image forming apparatuses and information processing terminals, for generating or processing print jobs have so-called reservation printing functions or pre-printing paper sheet confirmation functions.

However, in such an image processing apparatus, in a case where both of reservation printing and pre-printing sheet paper confirmation are set for one print job, a practical inconvenience may be caused. For example, the image processing apparatus may request user's paper sheet confirmation at a time such as midnight when the user is absent. In this case, the image processing apparatus halts the printing process until the user's paper sheet confirmation is done. The image processing apparatus normally performs the printing process on the basis of the print job, but the printing process cannot be proceeded.

SUMMARY OF THE INVENTION

The present invention provides an image processing apparatus capable of, even in a case where both of reservation printing and pre-printing paper sheet confirmation are set for one print job, preventing a printing process from substantially being halted due to a conflict between setting of the reservation printing and setting of the pre-printing paper sheet confirmation, and provides a method therefor and a storage medium.

Accordingly, the present invention provides an image processing apparatus comprising a memory device that stores a set of instructions, and at least one processor that executes the instructions to: generate a print job; generate a time request for starting printing based on the print job at a specified time; and generate a print medium confirmation request for prompting a user to confirm a print medium when printing based on the print job is started, wherein the at least one processor performs one of the following processes: a first process, in which the time request and the print medium confirmation request are exclusively generated, the print job is generated so as to include the generated time request or the generated print medium confirmation request, and a process corresponding to the time request or the print medium confirmation request included in the generated print job is performed prior to printing based on the generated print job; and a second process, in which the time request and the print medium confirmation request are generated, a print job including the generated time request and the generated print medium confirmation request is generated, and a process corresponding to the time request included in the generated print job or a process corresponding to the print medium confirmation request included in the generated print job is exclusively performed prior to printing based on the generated print job.

According to the present invention, even in a case where both of reservation printing and pre-printing paper sheet confirmation are set for one print job, a printing process can be prevented from substantially being halted due to a confliction between setting of the reservation printing and setting of the pre-printing paper sheet confirmation.

Further features of the present invention will become apparent from the following description of exemplary embodiments with reference to the attached drawings.

BRIEF DESCRIPTION OF THE DRAWINGS

FIGS. 4A and 4B are diagrams each showing a setting screen which is displayed on a terminal display device of the information processing terminal in FIG. 2.

FIG. 7 is a diagram showing the data structure of a print job stored in an image forming apparatus as an image processing apparatus according to a second embodiment of the present invention.

FIG. 1 is a diagram showing the data structure of a job management list for managing unprocessed print jobs in the image forming apparatus.

DESCRIPTION OF THE EMBODIMENTS

The present invention will now be described in detail below with reference to the accompanying drawings showing embodiments thereof.

First Embodiment

Figure 1:
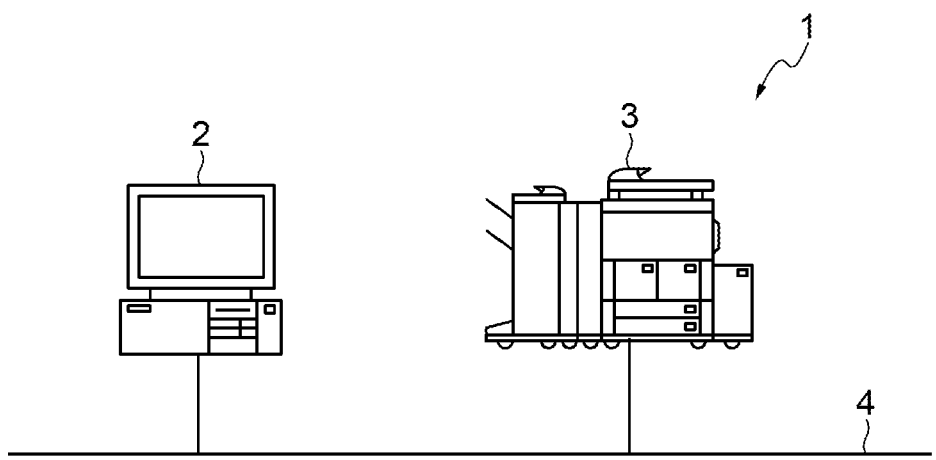
FIG. 1 is a configuration diagram of one example of an image processing system including image processing apparatuses according to a first embodiment of the present invention.

FIG. 1 is a configuration diagram of one example of an image processing system 1 including image processing apparatuses according to a first embodiment of the present invention. The image processing system 1 in FIG. 1 includes an information processing terminal 2, and an image forming apparatus 3 that processes a print job. The information processing terminal 2 and the image forming apparatus 3 are connected via a LAN 4 to each other such that bidirectional data communication can be performed therebetween. It should be noted that bidirectional data communication between the information processing terminal 2 and the image forming apparatus 3 may be performed by wireless communication.

Figure 2:
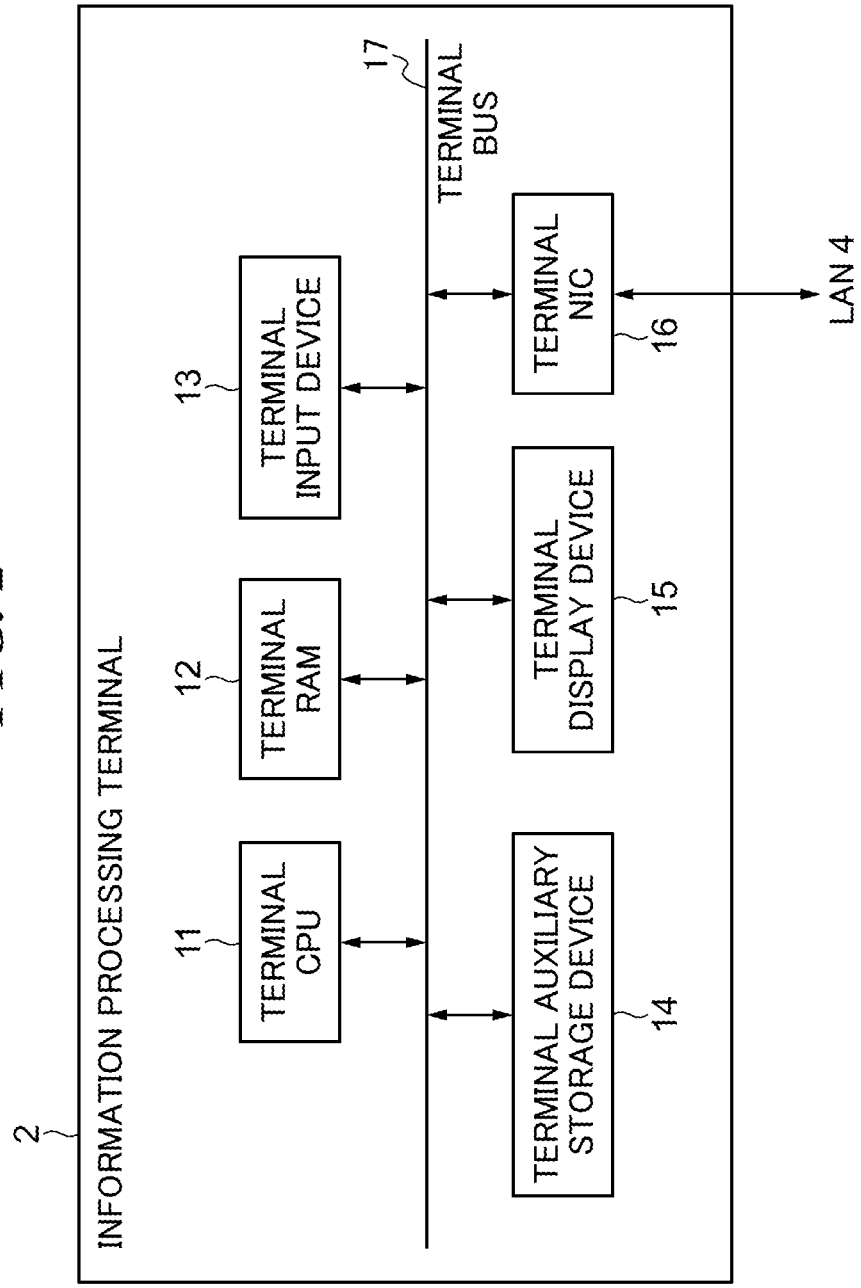
FIG. 2 is a diagram showing a schematic configuration of an information processing terminal in FIG. 1.

FIG. 2 is a diagram showing the schematic configuration of the information processing terminal 2 in FIG. 1. Any terminal may be used as the information processing terminal 2 as long as the terminal generates a print job and transmits the print job to the image forming apparatus 3. The information processing terminal 2 in FIG. 2 includes a terminal CPU 1, a terminal RAM 12, a terminal auxiliary storage device 14, a terminal display device 15, a terminal input device 13, a terminal NIC 16, and a terminal bus 17 that connects these components to one another so as to allow transmission/reception of data among the components.

The terminal auxiliary storage device 14 is, for example, a hard disk device, a floppy disk device, or a CD-ROM device. The terminal auxiliary storage device 14 stores a program for generating a print job and transmitting the print job to the image forming apparatus 3. The terminal auxiliary storage device 14 may further store any other application program, various data, user information, and device information about the image processing system 1. The terminal CPU 11 reads the program from the terminal auxiliary storage device 14, and executes the program. In this way, a terminal printing control unit for generating a print job and transmitting the print job to the image forming apparatus 3, is implemented in the information processing terminal 2. The terminal RAM 12 provides a work area to the terminal CPU 11. For example, the terminal CPU 11 serving as the terminal printing control unit temporarily stores setting values for printing in the terminal RAM 12, and generates a print job by combining the setting values stored in the terminal RAM 12. It should be noted that data to be used for processing by the terminal CPU 11 may be stored in the terminal auxiliary storage device 14.

The terminal display device 15 is, for example, a CRT display device or a liquid crystal display device. For example, the terminal display device 15 displays a print setting screen as a user interface. The terminal display device 15 functions as a display unit for displaying a setting screen through which a user performs setting for printing. The terminal input device 13 is, for example, a mouse device or a keyboard device. For example, the terminal input device 13 detects an operation performed on the print setting screen as a user interface. The terminal NIC 16 is a network interface card device. The terminal NIC 16 is connected directly to the LAN 4, and transmits/receives data to/from a main NIC 34 of the image forming apparatus 3 connected to the LAN 4. The terminal NIC 16 functions as a transmission unit for transmitting a print job.

Figure 3:
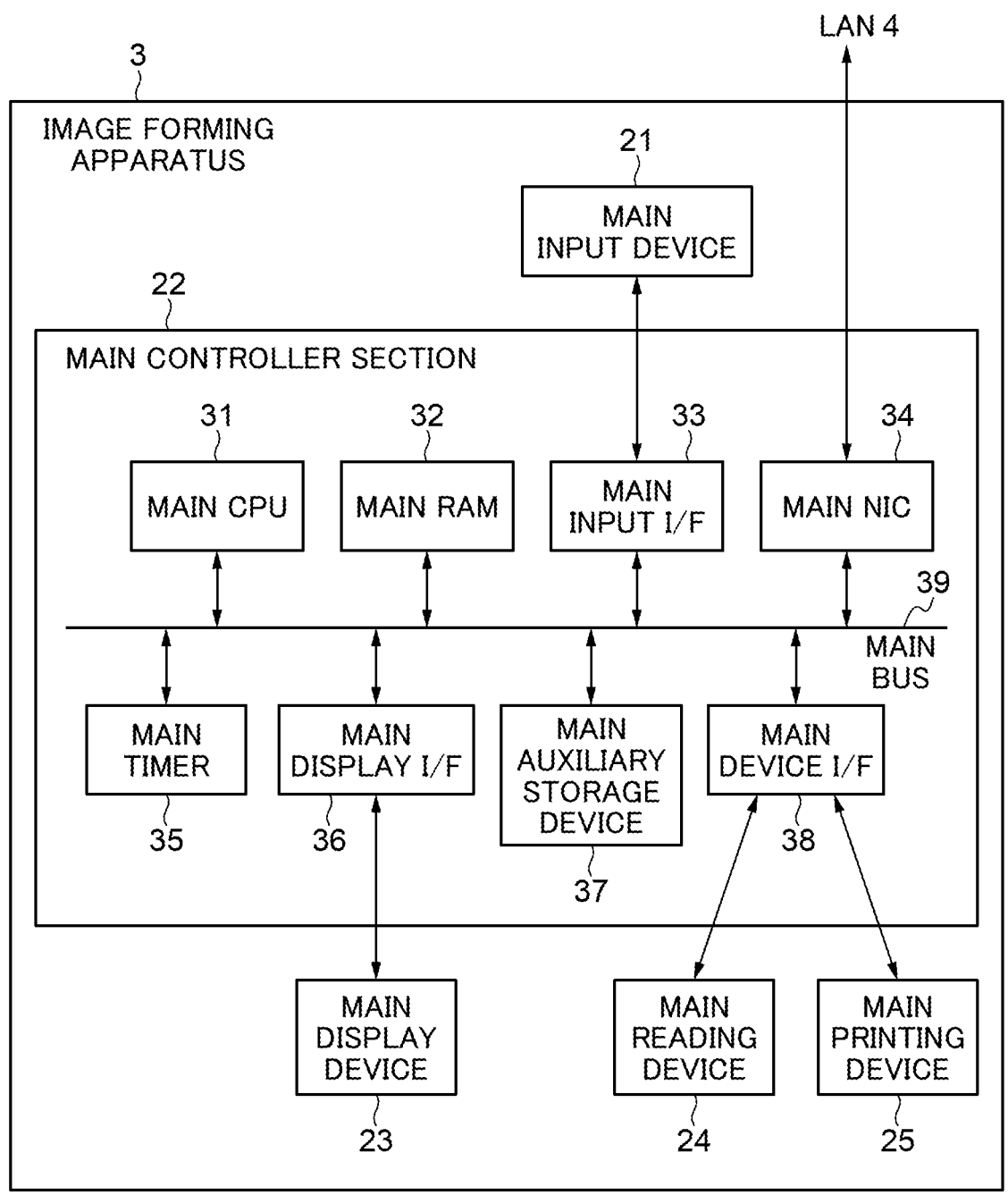
FIG. 3 is a diagram showing a schematic configuration of an image forming apparatus in FIG. 1.

FIG. 3 is a diagram showing the schematic configuration of the image forming apparatus 3 in FIG. 1. The image forming apparatus 3 receives a print job, and executes a printing process. As a result, an image according to the print job is printed on a print medium such as a paper sheet. The image forming apparatus 3 in FIG. 3 includes a main controller section 22, a main reading device 24, a main printing device 25, a main input device 21, and a main display device 23.

The main reading device 24 generates image data by reading an image formed on an original. The main printing device 25 prints an image based on the image data, on a print medium. The main display device 23 is, for example, a liquid crystal display device. The main display device 23 displays, as a user interface, a confirmation screen for printing, for example.

The main input device 21 is, for example, a touch panel device or a ten-key device. For example, the main input device 21 detects an operation performed on the confirmation screen for printing as a user interface. The main controller section 22 includes a main CPU 31, a main RAM 32, a main auxiliary storage device 37, and a main NIC 34. The main controller section 22 further includes a main device L % F (interface) 38, a main input I/F 33, a main display/F 36, a main timer 35, and a main bus 39 that connects these components to one another so as to allow transmission/reception of data among the components.

The main auxiliary storage device 37 is, for example, a hard disk device, a floppy disk device, or a CD-ROM device. The main auxiliary storage device 37 stores a program for receiving a print job and executing a printing process. The main auxiliary storage device 37 may further store various data, user information, and device information about the image processing system 1, etc. The main CPU 31 reads the program from the main auxiliary storage device 37, and executes the program. In this way, a main printing control unit for receiving a print job and executing a printing process is implemented in the image forming apparatus 3. The main RAM 32 provides a work area to the main CPU 31. For example, the main CPU 31 as the main printing control unit temporarily stores a print job in the main RAM 32, and prints an image based on the print job on a print medium. It should be noted that data to be used for processing by the main CPU 31 may be stored in the main auxiliary storage device 37.

The main timer 35 specifies a time or measures a time. The main NIC 34 is a network interface card device. The main NIC 34 is connected directly to the LAN 4, and transmits/receives data to/from the terminal NIC 16 of the information processing terminal 2 connected to the LAN 4. The main NIC 34 functions as a reception unit for receiving a print job. The main device I/F 38 is a data input/output port. The main device I/F 38 is connected to the main reading device 24 and the main printing device 25. The main display I/F 36 is a data output port. The main display I/F 36 is connected to the main display device 23. The main input I/F 33 is a data input port. The main input I/F 33 is connected to the main input device 21.

In this image forming apparatus 3, the main CPU 31 acquires a print job received by the main NIC 34. The main CPU 31 temporarily stores the acquired print job in the main RAM 32 or the main auxiliary storage device 37. Thereafter, the main CPU 31 analyzes the print job and outputs the image based on the print job to the main printing device 25, and further, controls the main printing device 25 to print the image on the basis of setting values in the print job.

Meanwhile, in the image processing system 1 for performing such printing, in order to perform reservation printing for starting printing at a specified time, the information processing terminal 2 may generate a print job including a time request for starting the printing at the specified time, and transmit the print job to the image forming apparatus 3. In a case where the image forming apparatus 3 acquires the print job including the time request, the image forming apparatus 3 processes the print job at the specified time and prints the image based on the print job on a print medium. Alternatively, in the image processing system 1 for performing such printing, the information processing terminal 2 may generate a print job including a paper sheet confirmation request (also referred to as a pre-printing paper sheet confirmation request or a print medium confirmation request) for prompting a user to confirm a paper sheet prior to printing, and transmits the print job to the image forming apparatus 3. In this case, the image forming apparatus 3 performs printing based on the print job after the paper-sheet confirmation request is processed.

FIGS. 4A and 4B are diagrams each showing a setting screen which is displayed on the terminal display device 15 of the information processing terminal 2 in FIG. 2. FIG. 4A is a basic setting screen 40. FIG. 4B is a paper feeding setting screen 50. Examples of the setting screen further include a page setting screen, a finishing setting screen, and a print quality setting screen. The terminal CPU 11 displays the setting screen on the terminal display device 15 while switching among setting screens on the basis of a user operation to select a basic setting tab 41, a page setting tab 42, a finishing setting tab 43, a paper feeding tab 44, or a print quality setting tab 45, the tabs being displayed on the upper part of the setting screen.

On the basic setting screen 40 in FIG. 4A, a print output method 46, a reservation time 47, the number of copies, a printing orientation, a printing magnification, and the like can be set. At the input box for the print output method 46, a setting value of "printing" for a printing process to be immediately performed and a setting value of "reservation printing" for a printing process to be performed at a reservation time are displayed so as to be selectable by a pull-down method. Here, in a case where the "reservation printing" is selected, the terminal CPU 11 as a start time processing unit performs generation of a print job for reservation printing as a start time processing step. In the input box for the reservation time 47, the hour and minute of the time can be set as a reservation time. Only in a case where the "reservation printing" is selected in the input box for the print output method 46, the reservation time 47 can be set by an operation.

On the paper feeding setting screen 50 in FIG. 4B, a paper feed tray 51, pre-printing paper sheet confirmation 52, a character string 53 to be displayed in paper sheet confirmation, and the like can be set. In the input box for the paper feed tray 51, a paper sheet as a print medium can be selected by tray selection. The selected paper feeding stage is displayed with black and white colors inverted. In FIG. 4B, "manual feed" is selected. The pre-printing paper sheet confirmation 52 can be set by a checkbox therefor. In a case where the checkbox is checked, setting for urging a user to confirm a paper sheet prior to printing is turned ON (hereinafter, referred to as "set ON". It should be noted that in a case where this setting is OFF, the setting is referred to as "set OFF"). In this case, before the printing process is performed, the user confirms a paper sheet in the image forming apparatus 3, and performs a predetermined operation. In a case where the checkbox of the pre-printing paper sheet confirmation 52 is checked (set ON), input to the input box of the character string 53 is allowed. The user can input, as a memo, the type or size of a print paper sheet in the input box of the character string 53. In FIG. 4B, "set a coated paper sheet in the manual feeding tray" as the character string 53 is input.

The terminal CPU 11 as a medium confirmation processing unit generates a print job for prompting the user to confirm a print medium such as a paper sheet on the basis of a user's operation, in a medium confirmation processing step. On the page setting screen, the page layout or the magnification of an image to be printed can be set, the specific illustration of the page setting screen being omitted. On the finishing setting screen, setting of single side printing/both side printing, setting of a binding direction, setting of a paper ejection method, and the like can be performed. On the print quality setting screen, setting of a color mode (setting of color/monochrome), setting of the image quality of an output image such as setting of the resolution can be performed.

As described above, by enabling reservation printing and pre-printing paper sheet confirmation to be set during generation of a print job, the convenience of the image processing system 1 is improved. However, in a case where both of the reservation printing and the pre-printing paper sheet confirmation are set for one print job, a practical inconvenience may be caused. For example, the image processing apparatus may execute a process to prompt the user to confirm a paper sheet at the reservation time such as midnight when the user is absent. In this case, the image processing apparatus continues to wait for the user's paper sheet confirmation under the situation where the user is absent. The printing process in the image processing apparatus is substantially halted. The image processing apparatus normally executes the printing process on the basis of the print job, but the printing process cannot be proceeded. In the present embodiment, reservation printing or pre-printing paper sheet confirmation can be exclusively set for one print job, whereby a printing process in the image processing apparatus is prevented from being substantially halted.

Figure 5:
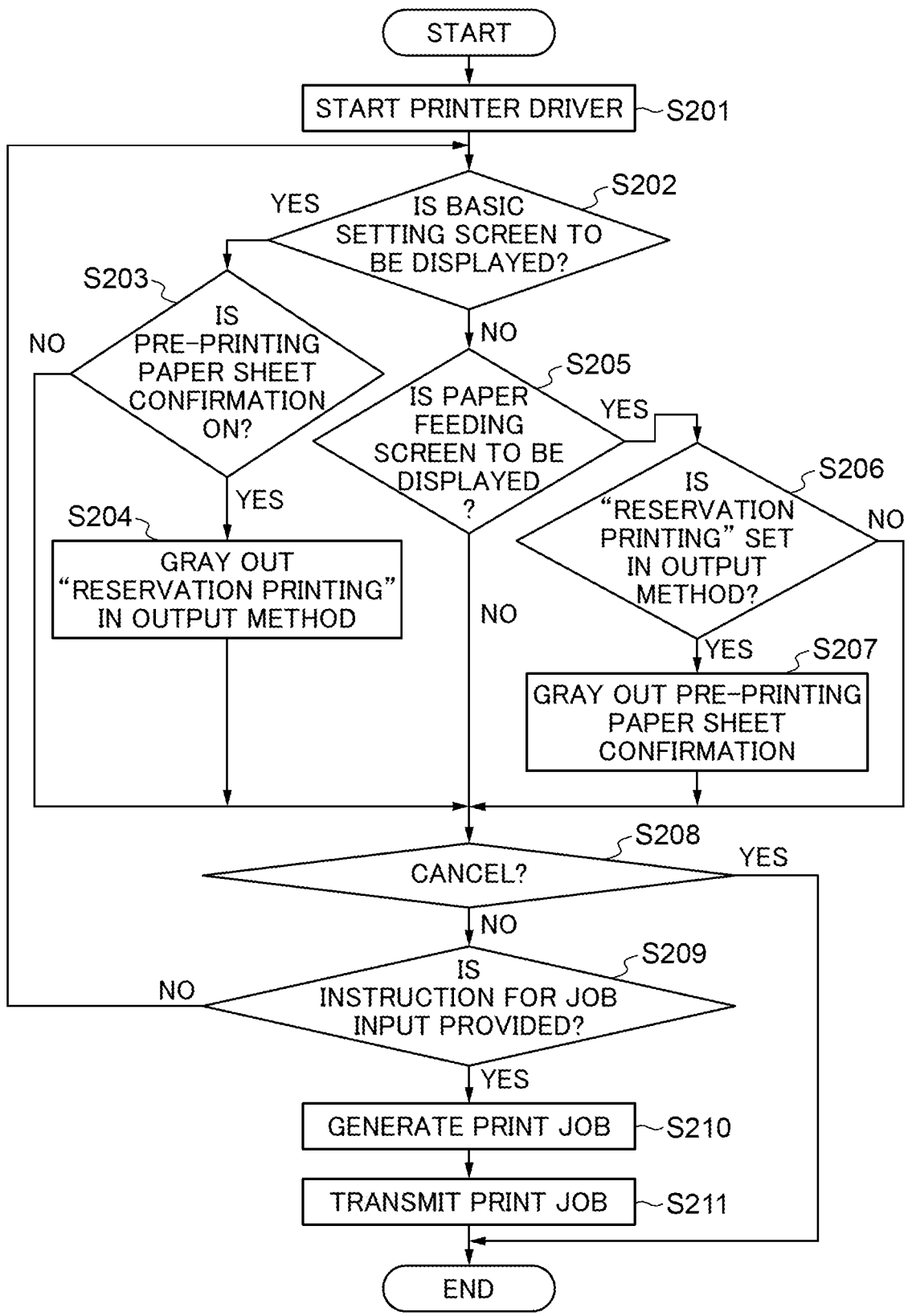
FIG. 5 is a flowchart showing a print job generation process in the information processing terminal in FIG. 2.

FIG. 5 is a flowchart showing a print job generation process in the information processing terminal 2 in FIG. 2. When generating a print job, the terminal CPU 11 executes a process in FIG. 5. The process in FIG. 5 is implemented by the terminal CPU 11 reading out the program stored in the terminal auxiliary storage device 14 to the terminal RAM 12 and executing the program, for example. In the print job generation process in FIG. 5, in step S201, the terminal CPU 11 receives a printing instruction from a user via an application, and starts a printer driver. The terminal CPU 11 reads the initial values of various settings such as printing setting, image processing setting, etc., stored in the terminal auxiliary storage device 14, for example. Then, the terminal CPU 11 displays a setting screen for printing on the terminal display device 15. The terminal CPU 11 first displays the basic setting screen 40 in FIG. 4A. Then, the terminal CPU 11 switches the displayed setting screen on the basis of a user's operation.

In step S202, while executing this display switching of the setting screen, the terminal CPU 11 determines whether or not to display the basic setting screen 40 in FIG. 4A. In a case where the basic setting screen 40 is to be displayed, the terminal CPU 11 determines, in step S203, whether the pre-printing paper sheet confirmation has been set ON. In a case where the pre-printing paper sheet confirmation has been set ON, the terminal CPU 11 grays out, in step S204, "reservation printing" in the input box for the print output method 46 on the basic setting screen 40 in FIG. 4A such that "reservation printing" is unselectable. As a result, a time request cannot be included in the print job, and reservation printing cannot be set. In a case where the pre-printing paper sheet confirmation has not been set ON, the terminal CPU 11 displays the basic setting screen 40 in FIG. 4A while "reservation printing" is in a selectable state.

In a case where the basic setting screen 40 is not displayed in step S202, the terminal CPU 11 determines, in step S205, whether or not to display the paper feeding setting screen 50 in FIG. 4B. In a case where the paper feeding setting screen 50 is to be displayed, the terminal CPU 11 determines, in step S206, whether or not "reservation printing" has been set in the print output method 46. In a case where the "reservation printing" has been set, the terminal CPU 11 grays out, in step S207, the checkbox of the pre-printing paper sheet confirmation 52 on the paper feeding setting screen 50 in FIG. 4B such that the checkbox of the pre-printing paper sheet confirmation 52 is unselectable. As a result, on the paper feeding setting screen 50 in FIG. 4B, a print medium confirmation request can be inhibited from being included in a print job. In a case where the "reservation printing" has not been set, the terminal CPU 11 displays the paper feeding setting screen 50 in FIG. 4B while the checkbox of the pre-printing paper sheet confirmation 52 is in a selectable state.

After execution of either one of the aforementioned displays, the terminal CPU 11 causes the process to proceed to step S208. In step S208, the terminal CPU 11 determines whether or not a cancel button has been pressed. In a case where the cancel button has been pressed, the terminal CPU 11 ends the process shown in FIG. 5.

In a case where the cancel button has not been pressed, the terminal CPU 11 determines, in step S209, whether or not an instruction for a job input has been provided on the basis of whether or not an OK button has been pressed. In a case where the OK button has not been pressed, the terminal CPU 11 returns the process to step S202. Until the OK button is pressed, the terminal CPU 11 repeats the aforementioned process. In a case where the OK button has been pressed, the terminal CPU 11 generates, in step S210, a print job on the basis of the various print settings set by the user before this step. The print job to be generated has a print output method (the setting value of "reservation printing", etc.) set by the user, as well as user information, a job name, and the like. In a case where the setting value is "reservation printing", a time request for starting printing based on the job at a specified time, is included in the print job. In a case where the pre-printing paper sheet confirmation 52 is set ON, a print medium confirmation request is included in the print job. The terminal CPU 11 transmits the generated print job to the image forming apparatus 3 via the LAN 4. Thereafter, the terminal CPU 11 ends the process in FIG. 5.

Figure 6:
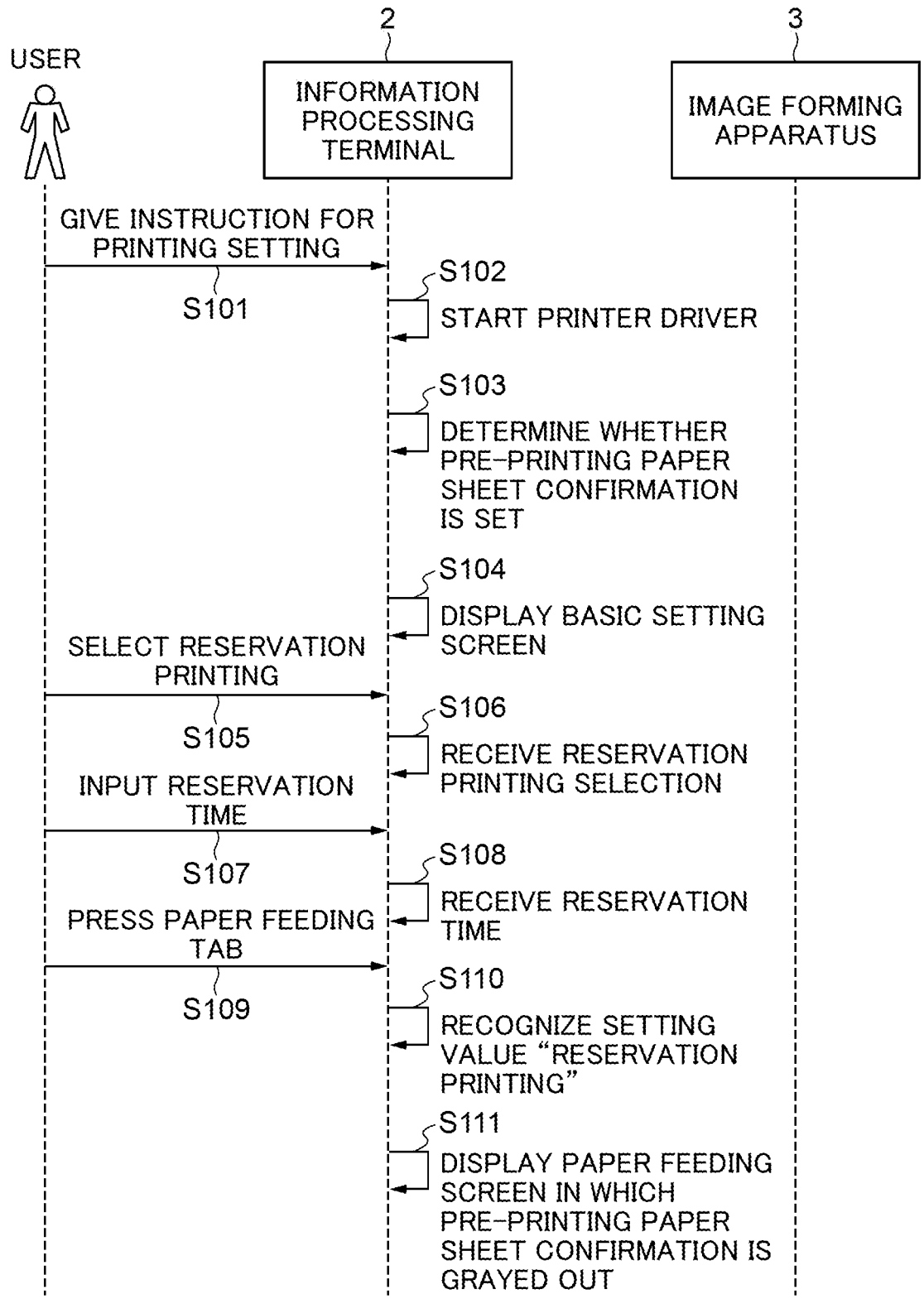
FIG. 6 is a sequence diagram showing one example of an entire system process in the image processing system in FIG. 1.

FIG. 6 is a sequence diagram showing one example of the entire system process in the image processing system 1 in FIG. 1. In step S101, a user gives an instruction about print setting at the information processing terminal 2. In step S102, the information processing terminal 2 starts a printer driver. In step S103, the information processing terminal 2 determines whether pre-printing paper sheet confirmation is set. In step S104, the information processing terminal 2 displays the basic setting screen 40 on the terminal display device 15. Here, reservation printing is displayed so as to be selectable as the print output method 46. In step S105, the user selects reservation printing on the basic setting screen 40.

In step S106, the information processing terminal 2 receives the selection of reservation printing. In step S107, the user inputs a reservation time on the basic setting screen 40. In step S108, the information processing terminal 2 receives the input reservation time. In step S109, the user presses the paper feeding tab 44 which is displayed together with the basic setting screen 40. In step S110, the information processing terminal 2 recognizes that the setting value of the output method is "reservation printing". In step S111, the information processing terminal 2 grays out the pre-printing paper sheet confirmation 52, and displays the paper feeding setting screen 50. In this way, in a case where the user sets reservation printing, setting of the pre-printing paper sheet confirmation cannot be turned ON.

As described above, in the present embodiment, a time request or a print medium confirmation request is exclusively included in one print job generated in the information processing terminal 2. Accordingly, reservation printing or pre-printing paper sheet confirmation is exclusively set for one print job. In a case where a time request is generated, the information processing terminal 2 prohibits generation of a print medium confirmation request. In a case where a print medium confirmation request is generated, the information processing terminal 2 prohibits generation of a time request. The information processing terminal 2 transmits, to the image forming apparatus 3, one of a time request and a print medium confirmation request in each generated print job. In this way, in a printing process based on the print job, only one of a time request and a print medium confirmation request is effectively set.

As a result, a printing process based on one print job can be prevented from being substantially halted due to the print job including both of a time request and a print medium confirmation request. For example, a printing process in an image processing apparatus can be prevented from being substantially halted due to a request for a paper sheet confirmation to a user when printing is started at a time when a user's confirmation is impossible. Moreover, in the present embodiment, when one of reservation printing and pre-printing paper sheet confirmation is set on the setting screen, setting of the other is prohibited. Accordingly, the user can recognize that setting of both of reservation printing and pre-printing paper sheet confirmation is not simultaneously allowed. It should be noted that, in the present embodiment, the information processing terminal 2 generates the print job 60. However, the entire process from generation of the print job 60 to printing may be performed in the image forming apparatus 3.

Second Embodiment

Next, the image processing system 1 according to a second embodiment of the present invention will be described. In the second embodiment, the image processing apparatus 3 that receives and processes a print job, exclusively processes setting of reservation printing or setting of pre-printing paper sheet confirmation. Hereinafter, the difference from the first embodiment will be mainly described.

FIG. 7 is a diagram showing the data structure of a print job 60 stored in the image forming apparatus 3 as the image processing apparatus according to the second embodiment of the present invention. The print job 60 is temporarily stored in the main auxiliary storage device 37. The print job 60 in FIG. 7 has a print job name 61, a user ID 62, a print output method 63, a reservation time 64, print setting 65, pre-printing paper sheet confirmation 66, a character string 67 to be displayed on a confirmation screen, and printing data 68.

The print job name 61 is a file name for uniquely specifying the print job 60 in the image processing apparatus 3. The user ID 62 is identification information for specifying a user of the information processing terminal 2 who has given an instruction for printing. The print output method 63 is the setting value of an output method set at the information processing terminal 2. The reservation time 64 is the setting value of an output time set at the information processing terminal 2. The print setting 65 is the setting value of the number of copies, a tray, or the like set at the information processing terminal 2. The pre-printing paper sheet confirmation 66 is the setting value of the necessity/unnecessity of pre-printing paper sheet confirmation set at the information processing terminal 2. The character string 67 to be displayed on a confirmation screen is the setting value of a character string to be displayed on the pre-printing paper sheet confirmation screen set at the information processing terminal 2. The printing data 68 is data of an image to be printed on a print medium such as a paper sheet. In FIG. 7, the printing data 68 is PDL data of drawing software. As described above, both of a time request and a print medium confirmation request are set in the print job 60 in FIG. 7.

Figure 8:
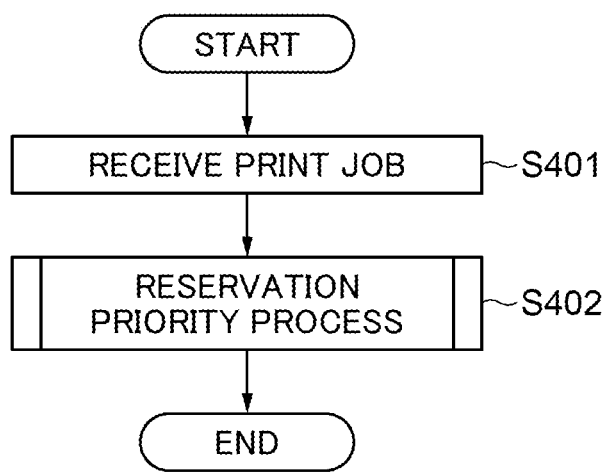
FIG. 8 is a flowchart showing a job reception process in the image forming apparatus.
Figure 9:
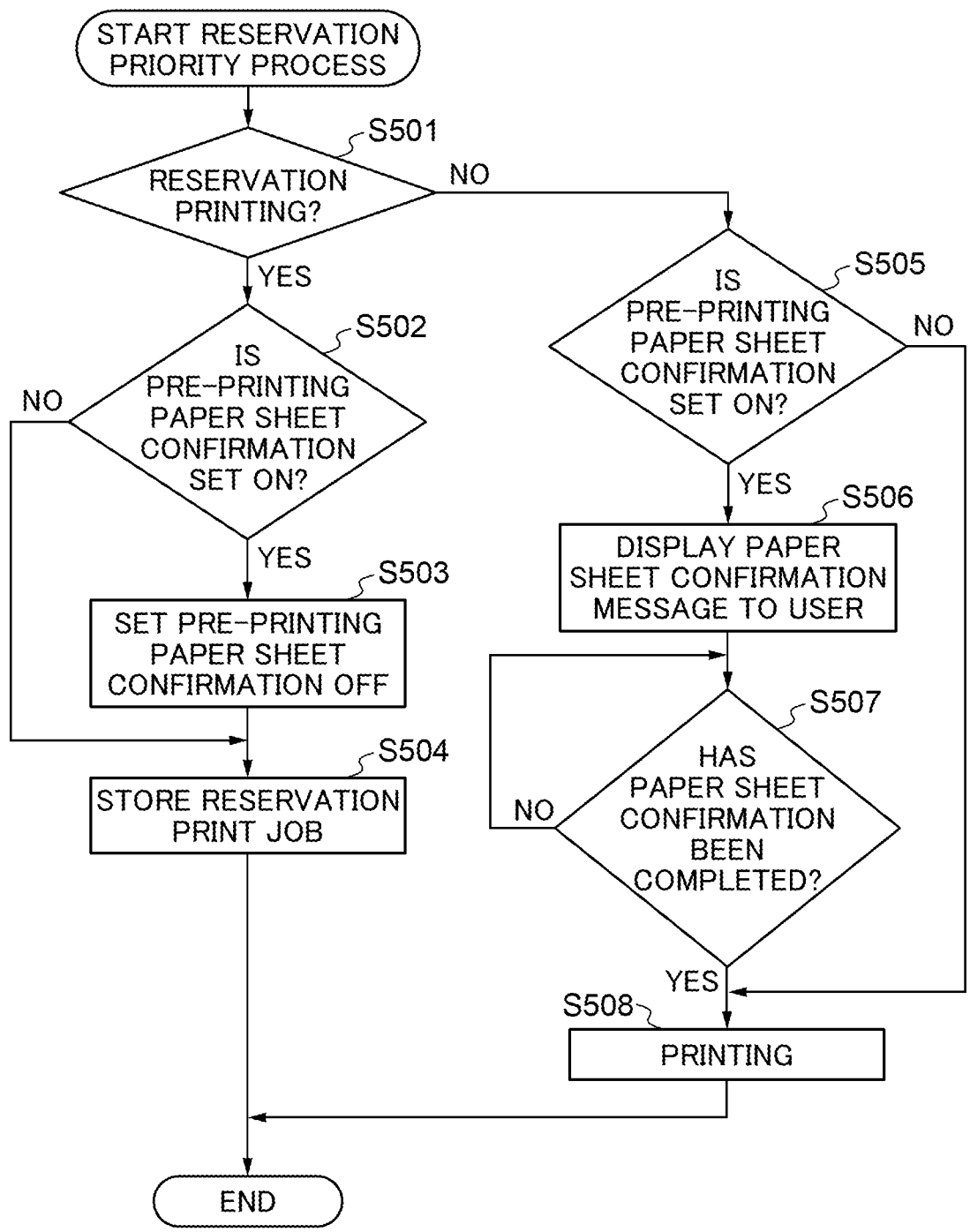
FIG. 9 is a flowchart showing the details of a reservation priority process in step S402 in FIG. 8.

FIG. 8 is a flowchart showing a job reception process in the image forming apparatus 3. FIG. 9 is a flowchart showing the details of the reservation priority process in step S402 in FIG. 8. The processes in FIGS. 8 and 9 are implemented by the main CPU 31 of the image forming apparatus 3 reading out the program stored in the main auxiliary storage device 37 to the main RAM 32 and executing the program. When the main NIC 34 receives the print job 60, the main CPU 31 executes the process in FIG. 8. In step S401 in FIG. 8, the main CPU 31 receives the print job 60 from the information processing terminal 2.

Accordingly, the main CPU 31 performs the reservation priority process in step S402.

In step S501 of the reservation priority process in FIG. 9, the main CPU 31 determines whether or not "reservation printing" is set as the output method, by analyzing the output method in the print job 60. In a case where the "reservation printing" is set as the output method, the main CPU 31 determines, in step S502, whether or not the pre-printing paper sheet confirmation is set ON. In a case where the pre-printing paper sheet confirmation is set ON, the main CPU 31 changes the pre-printing paper sheet confirmation to OFF so as to invalidate the pre-printing paper sheet confirmation in step S503. Specifically, the main CPU 31 invalidates the print medium confirmation request, out of the received time request and the received print medium confirmation request. Thereafter, in step S504, the main CPU 31 stores the received print job 60 into the main auxiliary storage device 37 or the main RAM 32, as a print job 60 in which reservation printing is set (a reserved print job 60). Also in a case where the pre-printing paper sheet confirmation is set OFF in step S502, the main CPU 31 stores the received print job 60 as a print job 60 in which reservation printing is set, in step S504. Thereafter, the main CPU 31 ends the process in FIG. 9.

In a case where "reservation printing" is not set as the output method in step S501, the main CPU 31 determines, in step S505, whether or not the pre-printing paper sheet confirmation is set ON. In a case where the pre-printing paper sheet confirmation is set ON, the main CPU 31 displays, in step S506, a screen for prompting the user to confirm a paper sheet (a paper sheet confirmation screen 80 (described later), as one example), on the main display device 23.

Figure 10:
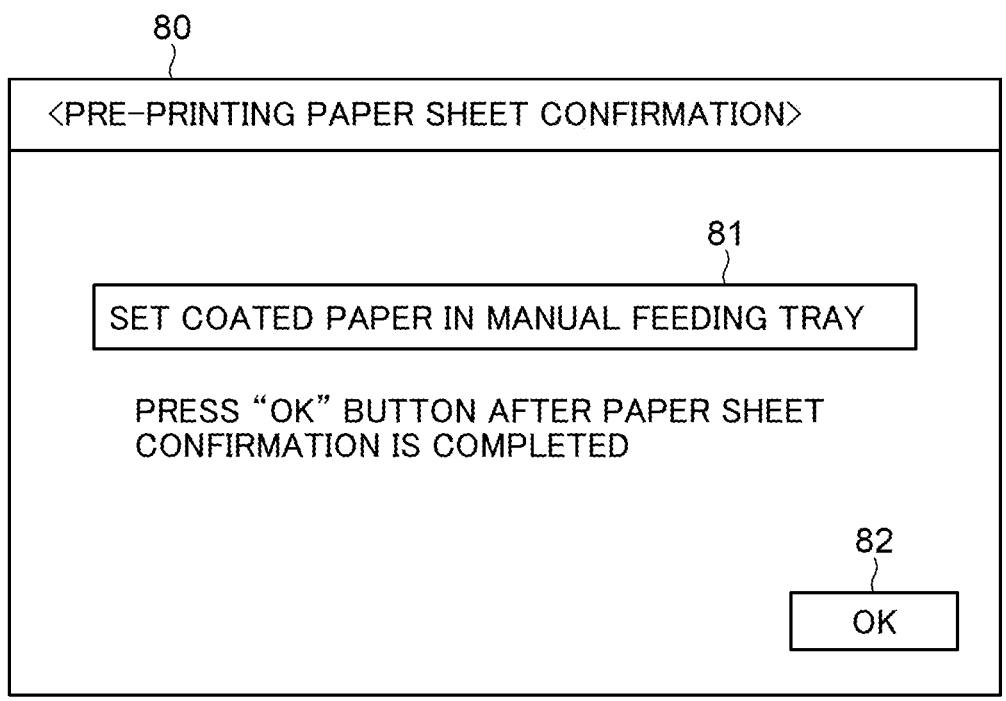
FIG. 10 is a diagram of a paper sheet confirmation screen which is displayed on the image forming apparatus.

FIG. 10 is a diagram of the paper sheet confirmation screen 80 which is displayed on the image forming apparatus 3. A character string 81 is displayed as a message on the paper sheet confirmation screen 80 on the basis of the display character string 67 in the print job 60. Further, an OK button 82 is displayed on the paper sheet confirmation screen 80. After confirming a predetermined paper sheet to be fed in the image forming apparatus 3, the user presses the OK button 82 (confirmation completing operation). As a result, in step S507 in FIG. 9, the main CPU 31 determines that a paper sheet has been confirmed by the user. The main CPU 31 repeats the process in step S507 until a user's confirmation completing operation is performed. When determining that the user's paper sheet confirmation has been completed, the main CPU 31 performs, in step S508, printing by using the main printing device 25 on the basis of the print job 60. Also in a case where the pre-printing paper sheet confirmation is set OFF in step S505, the main CPU 31 performs, in step S508, printing by using the main printing device 25 on the basis of the print job 60. Thereafter, the main CPU 31 ends the process in FIG. 9.

FIG. 11 is a diagram showing the data structure of a job management list 70 for managing unprocessed print jobs 60 in the image forming apparatus 3. The job management list 70 is stored in the main auxiliary storage device 37 or the main RAM 32 by the main CPU 31. In step S504 in FIG. 9, the main CPU 31 registers a new print job 60 in the job management list 70. As shown in rows in FIG. 11, the job management list 70 has management records 71 for each print job 60. The management records 71 each have reception date and time 72, a user ID 73, a print job name 74, an output method 75, a reservation time 76, and a storage place 77. However, pre-printing paper sheet confirmation to be invalidated is not included in the management records 71.

The reception date and time 72 is date and time at which the image forming apparatus 3 received the print job 60. The user ID 73 is equivalent to the user ID 62 included in the print job 60. The print job name 74 is the file name of the print job 60 stored in the image forming apparatus 3, and is equivalent to the print job name 61 included in the print job 60. The output method 75 is equivalent to the output method 63 included in the print job 60. In the management record 71 related to a reserved print job 60, "reservation printing" is registered as the output method 75. The reservation time 76 is equivalent to the reservation time 64 included in the print job 60. In a case where "reservation printing" is registered as the output method 75, the reservation time 76 is registered. The storage place 77 is a storage place for the print job 60 stored in the main auxiliary storage device 37 by the main CPU 31.

Figure 12:
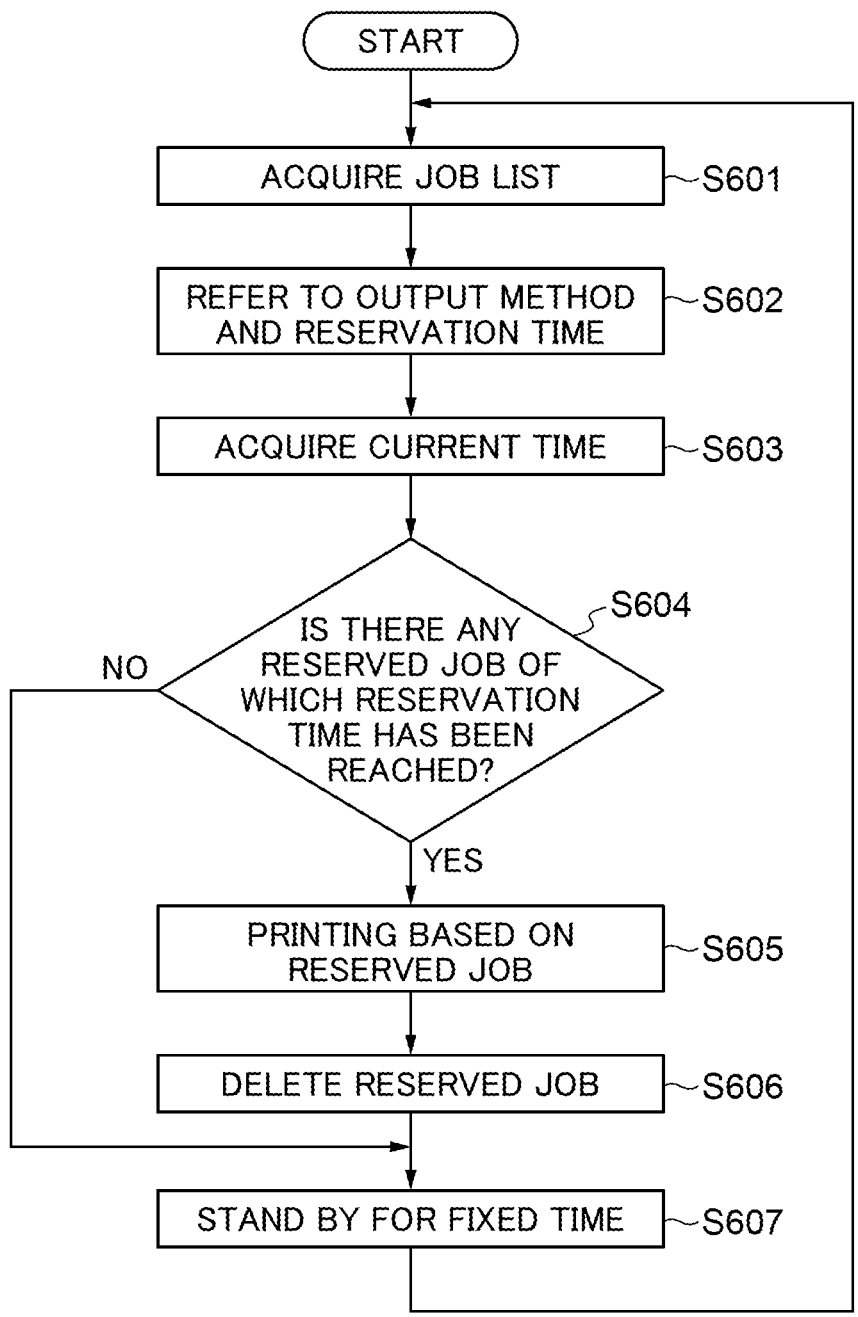
FIG. 12 is a flowchart showing a process for a reserved print job, which is performed by the image forming apparatus.

FIG. 12 is a flowchart showing the process for a reserved print job 60 in the image forming apparatus 3. During a time when the image forming apparatus 3 is operating, the main CPU 31 repeatedly executes a series of the process in FIG. 12. It should be noted that the main CPU 31 may start executing the process in FIG. 12 by a periodic interrupt by the main timer 35. In step S601, the main CPU 31 acquires the job management list 70. In step S602, the main CPU 31 refers to the output method 75 and the reservation time 76 of the job management list 70. In step S603, the main CPU 31 acquires a current time from the main timer 35.

In step S604, the main CPU 31 determines whether there is a reserved print job 60 of which the reservation time has been reached. In a case where there is no reserved print job 60 of which the reservation time has been reached, the main CPU 31 stands by for a fixed time period in step S607. Thereafter, the main CPU 31 returns the process to step S601, and repeats the process for reserved print jobs 60.

In a case where there is a reserved print job 60 of which the reservation time has been reached, the main CPU 31 performs, in step S605, a printing process on the basis of the print job 60. Thereafter, the main CPU 31 deletes the print job 60 executed in step S606 from the main auxiliary storage device 37, and deletes the management record 71 of the executed print job 60 from the job management list 70. The main CPU 31 stands by for a fixed time in step S607. Thereafter, the main CPU 31 returns the process to step S601, and repeats the process for reserved print jobs 60.

Figure 13:
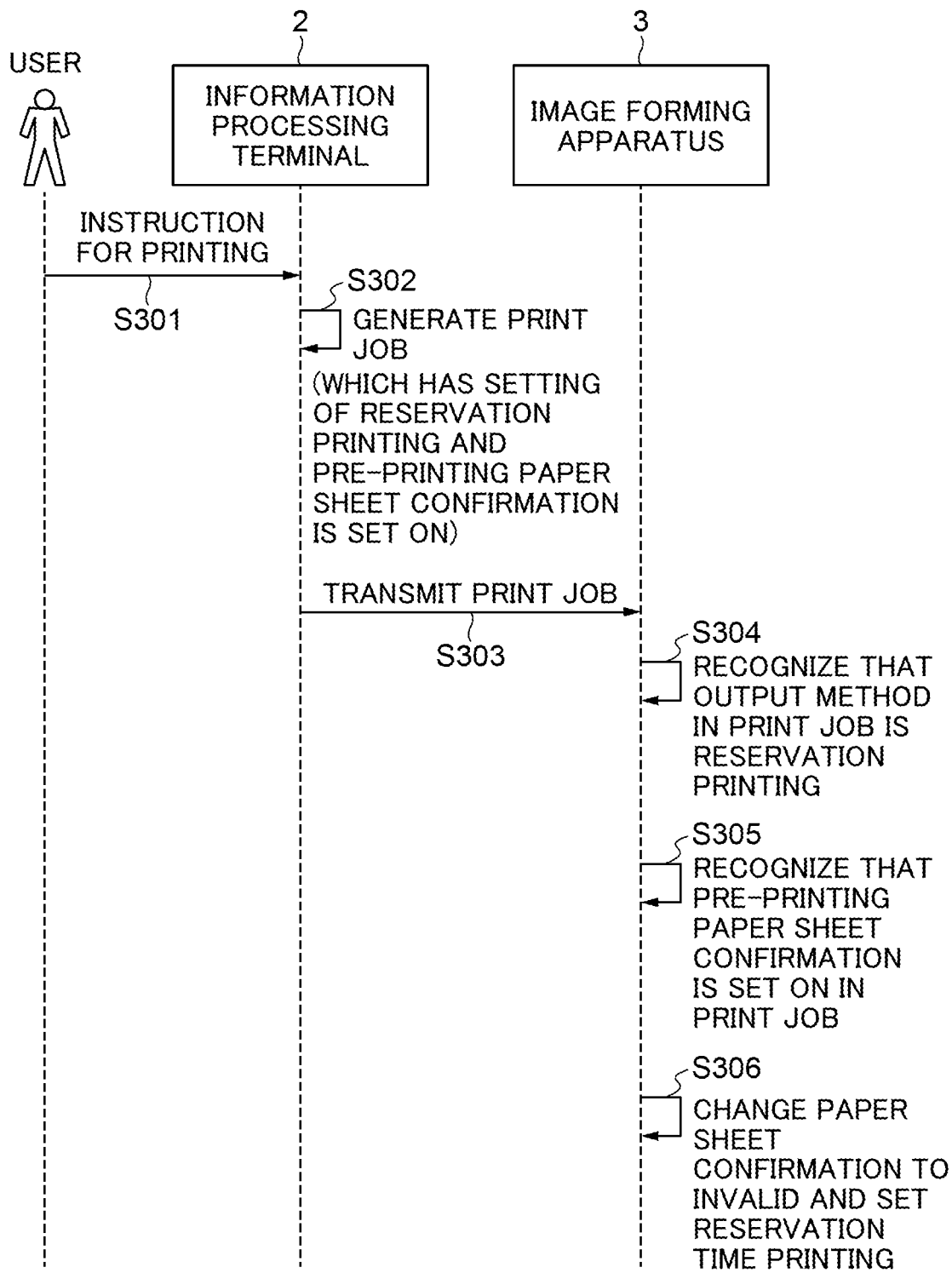
FIG. 13 is a sequence diagram showing one example of the entire system process in the image processing system.

FIG. 13 is a sequence diagram showing one example of the entire system process in the image processing system 1. In step S301, a user gives an instruction for printing at the information processing terminal 2. In step S302, the information processing terminal 2 generates a print job 60. Here, the information processing terminal 2 generates the print job 60 which has setting of reservation printing and in which pre-printing paper sheet confirmation is set ON. In step S303, the information processing terminal 2 transmits the generated print job 60 to the image forming apparatus 3.

In step S304, the image forming apparatus 3 recognizes that the print job 60 has setting of reservation printing, by analyzing the output method 63 in the received print job 60. In step S305, the image forming apparatus 3 recognizes that pre-printing paper sheet confirmation has been set in the received print job 60. In step S306, the image forming apparatus 3 changes the pre-printing paper sheet confirmation to OFF so as to invalidate the setting of pre-printing paper sheet confirmation, and sets reservation printing. In a case where both of reservation printing and pre-printing paper sheet confirmation are set in the received print job 60, the image forming apparatus 3 invalidates the setting of pre-printing paper sheet confirmation, and processes the print job 60 by considering that the print job 60 has ordinary reservation printing setting.

As described above, in the present embodiment, the time request or the print medium confirmation request included in one print job 60 is exclusively processed. In the aforementioned example, when printing based on the print job 60 is started, only the time request, out of the time request and the print medium confirmation request, is effectively processed.

As a result, the printing process in the image processing apparatus can be prevented from being substantially halted due to paper sheet confirmation required to a user when printing is started at a time when a user's confirmation is impossible. Furthermore, since the image forming apparatus 3 executes printing based on the received print job 60 at the set reservation time, a printing process based on the print job 60 can be started at a desired time, whereby printing on a print medium can be completed. Consequently, it is possible to prevent a printed matter obtained by the printing process from being left on the image forming apparatus 3 for a long time period. The user who recognizes a scheduled time for printing can obtain the printed matter which has just been made by printing in the image forming apparatus 3. It should be noted that, in the present embodiment, the case where the print job 60 generated in the information processing terminal 2 is transmitted to the image forming apparatus 3, and the image forming apparatus 3 performs the process from reception of the print job 60 to printing, was described. However, all the process from generation of the print job 60 to printing may be performed in one apparatus.

Third Embodiment

Next, the image processing system 1 according to a third embodiment of the present invention will be described. In the third embodiment, in the image processing apparatus 3 that receives and processes a print job 60, setting of reservation printing, out of setting of reservation printing and setting of pre-printing paper sheet confirmation, is invalidated. Hereinafter, the difference from the second embodiment will be mainly described.

Figure 14:
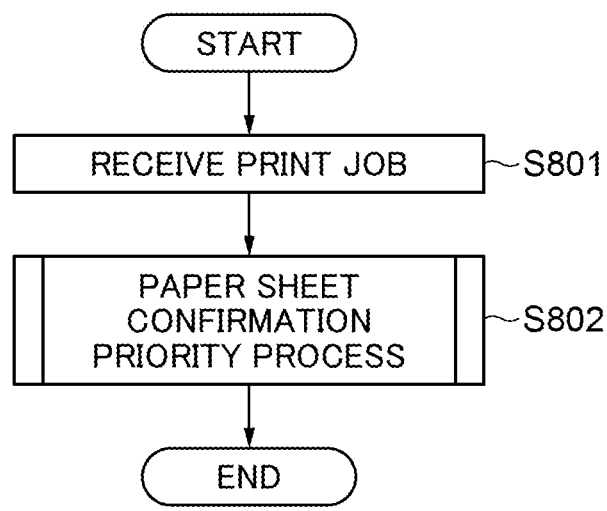
FIG. 14 is a flowchart showing a job reception process in an image forming apparatus as an image processing apparatus according to a third embodiment of the present invention.
Figure 15:
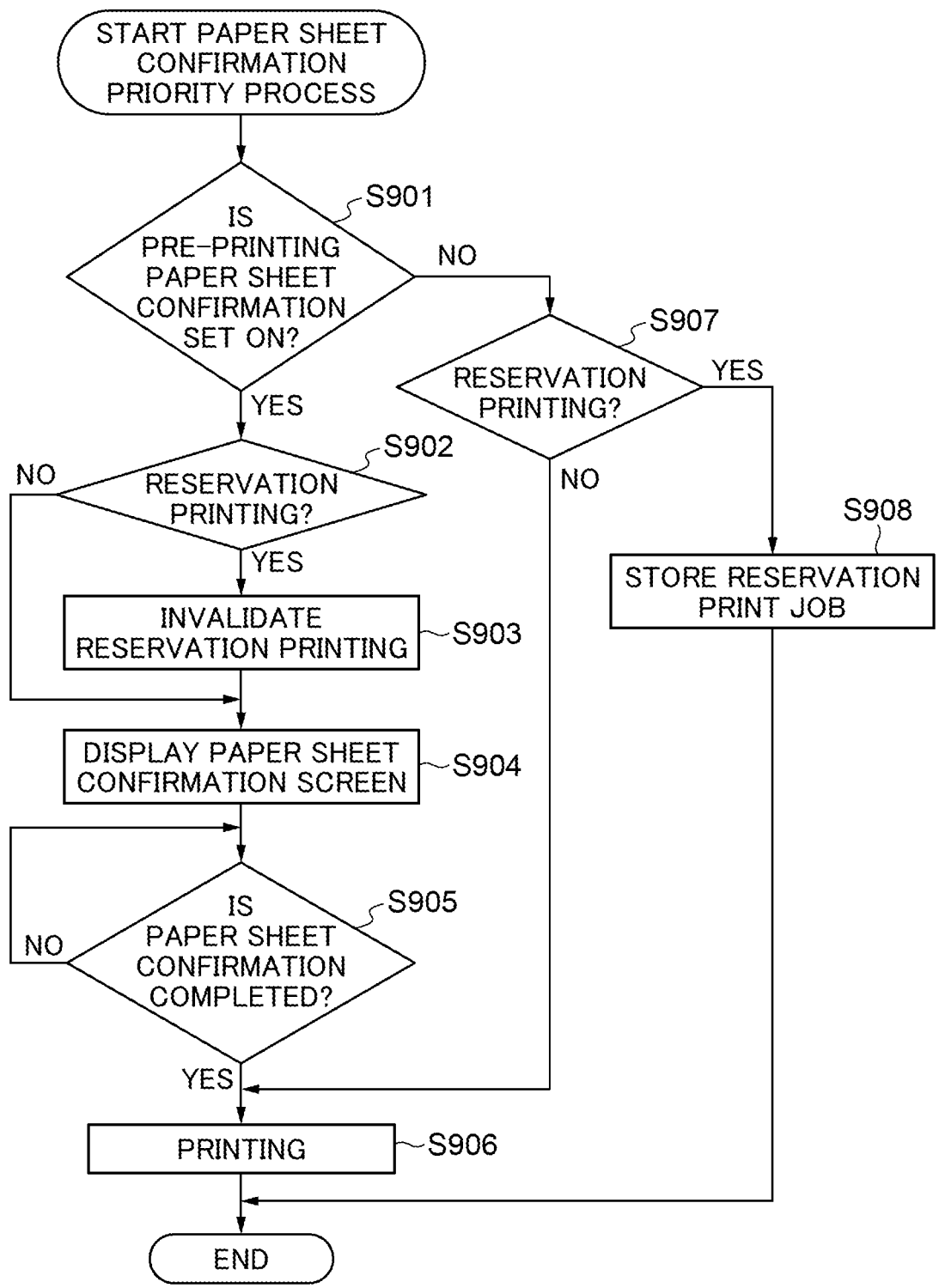
FIG. 15 is a flowchart showing the details of a paper sheet confirmation priority process in step S802 in FIG. 14.

FIG. 14 is a flowchart showing a job reception process in the image forming apparatus 3 as an image processing apparatus according to a third embodiment of the present invention. FIG. 15 is a flowchart showing the details of a paper sheet confirmation priority process in step S802 in FIG. 14. The processes in FIGS. 14 and 15 are implemented by the main CPU 31 of the image forming apparatus 3 reading out the program stored in the main auxiliary storage device 37 to the main RAM 32 and executing the program. When the main NIC 34 receives the print job 60, the main CPU 31 executes the process in FIG. 14. In step S801 in FIG. 14, the main CPU 31 receives the print job 60 from the information processing terminal 2. The main CPU 31 performs a paper sheet confirmation priority process in step S802.

In step S901 of the paper sheet confirmation priority process in FIG. 15, the main CPU 31 determines whether or not the pre-printing paper sheet confirmation is set ON, by analyzing the output method 63 in the print job 60. In a case where the pre-printing paper sheet confirmation is set ON, the main CPU 31 determines, in step S902, whether or not "reservation printing" is set as the output method. In a case where "reservation printing" is set as the output method, the main CPU 31 changes, in step S903, the setting of the "reservation printing" to OFF so as to invalidate the setting of the reservation printing. Here, the main CPU 31 invalidates the time request out of the received time request and the received print medium confirmation request. Thereafter, in step S904, the main CPU 31 displays the paper sheet confirmation screen 80 on the main display device 23. Also in a case where "reservation printing" has not been set as the output method in step S902, the main CPU 31 displays, in step S904, the paper sheet confirmation screen 80 on the main display device 23.

In step S905, the main CPU 31 determines whether or not the user's paper sheet confirmation has been completed, on the basis of whether or not a confirmation completing operation has been performed by the user. The main CPU 31 repeats the determination in step S905 until the user's confirmation completing operation is performed. In a case where user's paper sheet confirmation has been completed, the main CPU 31 performs, in step S906, printing based on the print job 60 by using the main printing device 25. Thereafter, the main CPU 31 ends the process in FIG. 9. In a case where the pre-printing paper sheet confirmation is set OFF in step S901, the main CPU 31 determines, in step S907, whether or not "reservation printing" is set as the output method. In a case where "reservation printing" is not set as the output method, the main CPU 31 performs, in step S906, printing based on the print job 60 by using the main printing device 25. In a case where "reservation printing" is set as the output method, the main CPU 31 stores, in step S908, the received print job 60 into the main auxiliary storage device 37 or the main RAM 32, as a received print job 60 in which reservation printing is set.

Figure 16:
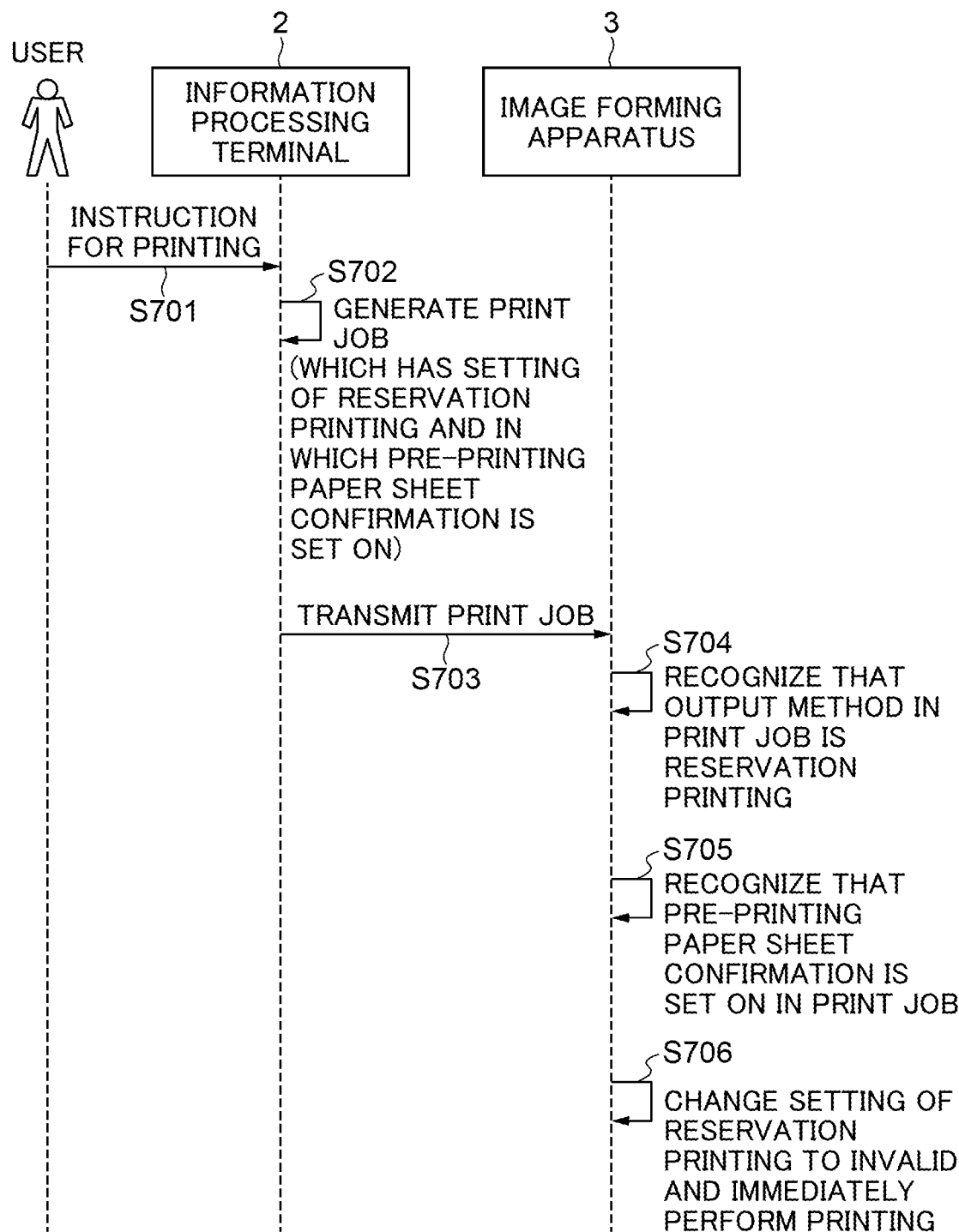
FIG. 16 is a sequence diagram showing one example of the entire system process in the image processing system.

FIG. 16 is a sequence diagram showing one example of the entire system process in the image processing system 1. In step S701, a user gives an instruction for printing at the information processing terminal 2. In step S702, the information processing terminal 2 generates a print job 60. Here, the information processing terminal 2 generates a print job 60 which has setting of reservation printing and in which pre-printing paper sheet confirmation is set ON. In step S703, the information processing terminal 2 transmits the generated print job 60 to the image forming apparatus 3.

In step S704, the image forming apparatus 3 recognizes that the print job 60 has the setting of reservation printing, by analyzing the output method 63 in the received print job 60. In step S705, the image forming apparatus 3 recognizes that pre-printing paper sheet confirmation is set in the received print job 60. In step S706, the image forming apparatus 3 changes the setting of reservation printing so as to invalidate the setting, and starts printing based on the print job 60 without waiting for a reservation time reached. In this way, in a case where reservation printing and pre-printing paper sheet confirmation are set in the received print job 60, the image forming apparatus 3 invalidates the reservation printing, and immediately starts the printing process as a ordinary print job 60.

As described above, in the present embodiment, the time request, out of the received time request and the received print medium confirmation request, is invalidated. Consequently, when executing the received print job 60, the image forming apparatus 3 starts printing based on the print job 60 after user's paper sheet confirmation is completed. As a result, before a time where the user becomes absent, the process of the print job 60 can be started, and the printing process on a desired print medium can be completed. The user can obtain a printed matter that is obtained by performing printing on a desired print medium on the basis of the print job 60. It should be noted that, in the present embodiment, the case where the print job 60 generated by the information processing terminal 2 is transmitted to the image forming apparatus 3, and the image forming apparatus 3 performs the process from reception of the print job 60 to printing, was described. However, all the process from generation of a print job 60 to printing may be performed in one apparatus.

Fourth Embodiment

Next, the image processing system 1 according to a fourth embodiment of the present invention will be described. In the fourth embodiment, in the image forming apparatus 3 that receives and processes the print job 60, one of setting of reservation printing and setting of pre-printing paper sheet confirmation is set so as to be processed with priority (priority setting). The other is invalidated on the basis of the priority setting. Hereinafter, the difference from the second embodiment will be mainly described.

Figure 17:
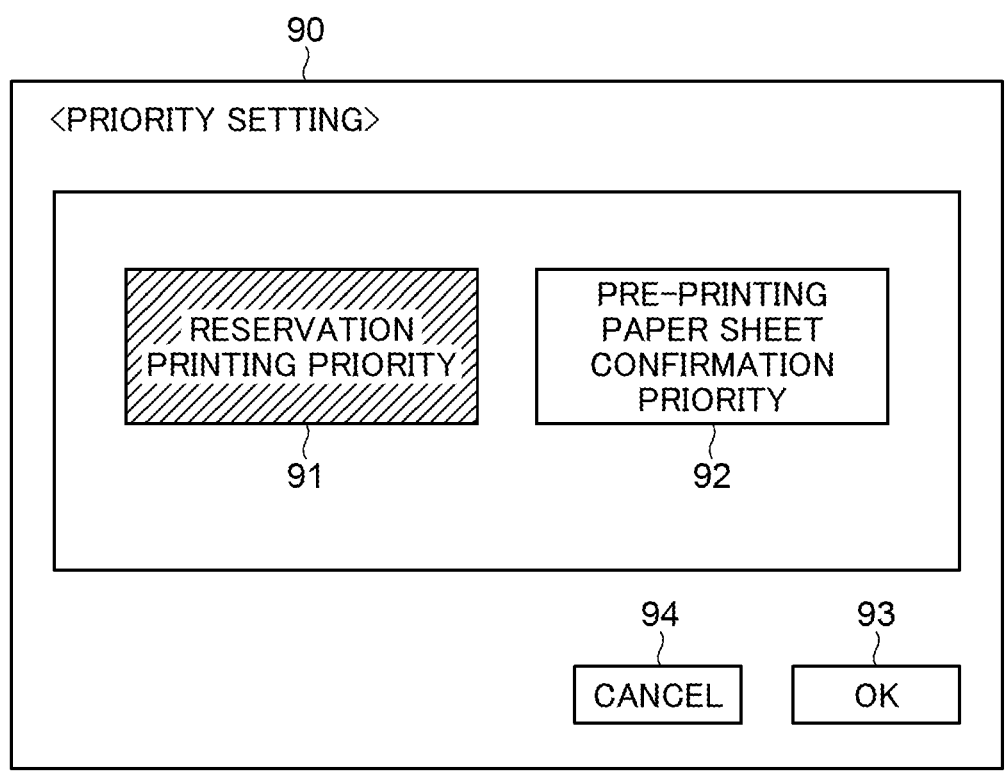
FIG. 17 is a diagram of a priority setting screen which is displayed on an image forming apparatus as an image processing apparatus according to a fourth embodiment of the present invention.

FIG. 17 is a diagram of a priority setting screen 90 which is displayed on the image forming apparatus 3 as an image processing apparatus according to the fourth embodiment of the present invention. The main CPU 31 displays the priority setting screen 90 in FIG. 17 on the main display device 23 on the basis of priority setting performed by a user. On the priority setting screen 90, a reservation printing priority button 91, a pre-printing paper sheet confirmation priority button 92, an OK button 93, and a cancel button 94 are displayed. In a case where the reservation printing priority button 91 and the OK button 93 are operated in this order by the user, the main CPU 31 stores, into the main auxiliary storage device 37, priority setting for giving priority to the setting of reservation printing. In a case where the pre-printing paper sheet confirmation priority button 92 and the OK button 93 are operated in this order by the user, the main CPU 31 stores, in the main auxiliary storage device 37, priority setting for giving priority to the setting of pre-printing paper sheet confirmation. In this way, the main CPU 31 sets the order of priority between setting of reservation printing and setting of pre-printing paper sheet confirmation.

Figure 18:
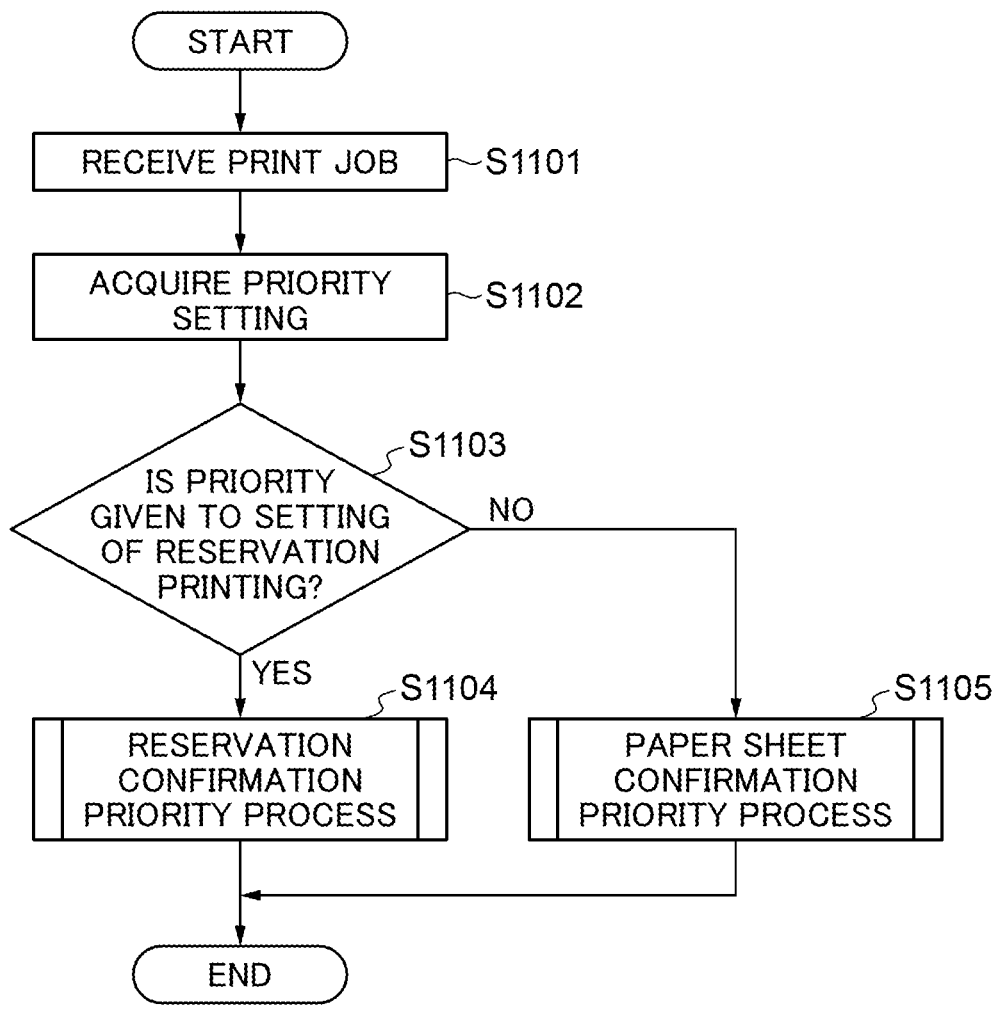
FIG. 18 is a flowchart showing a priority printing process in the image forming apparatus.

FIG. 18 is a flowchart showing the priority printing process in the image forming apparatus 3. When receiving a print job 60, the main CPU 31 executes the priority printing process. In step S1101, the main CPU 31 receives a print job 60. Next, in step S1102, the main CPU 31 acquires the priority setting stored in the main auxiliary storage device 37. In step S1103, the main CPU 31 determines whether the acquired priority setting is setting for giving priority to setting of reservation printing.

In a case where the acquired priority setting is setting for giving priority to setting of reservation printing, the main CPU 31 executes a reservation priority process in step S1104. As the reservation priority process, a process the same as the reservation priority process in FIG. 9 may be used. The main CPU 31 changes the setting of pre-printing paper sheet confirmation to OFF so as to invalidate the setting, as needed, and executes the printing process at a reservation time. In a case where the acquired priority setting is not setting for giving priority to setting of reservation printing in step St 103, that is, in a case where the acquired priority acquired priority setting is setting for giving priority to setting of pre-printing paper sheet confirmation, the main CPU 31 executes a paper sheet confirmation priority process in step S1105. As the paper sheet confirmation priority process, a process the same as the paper sheet confirmation priority process in FIG. 15 may be used. The main CPU 31 invalidates the setting of reservation printing, as needed, and executes a printing process while urging the user to confirm a paper sheet prior to printing. Thereafter, the main CPU 31 ends the process in FIG. 18.

Figure 19:
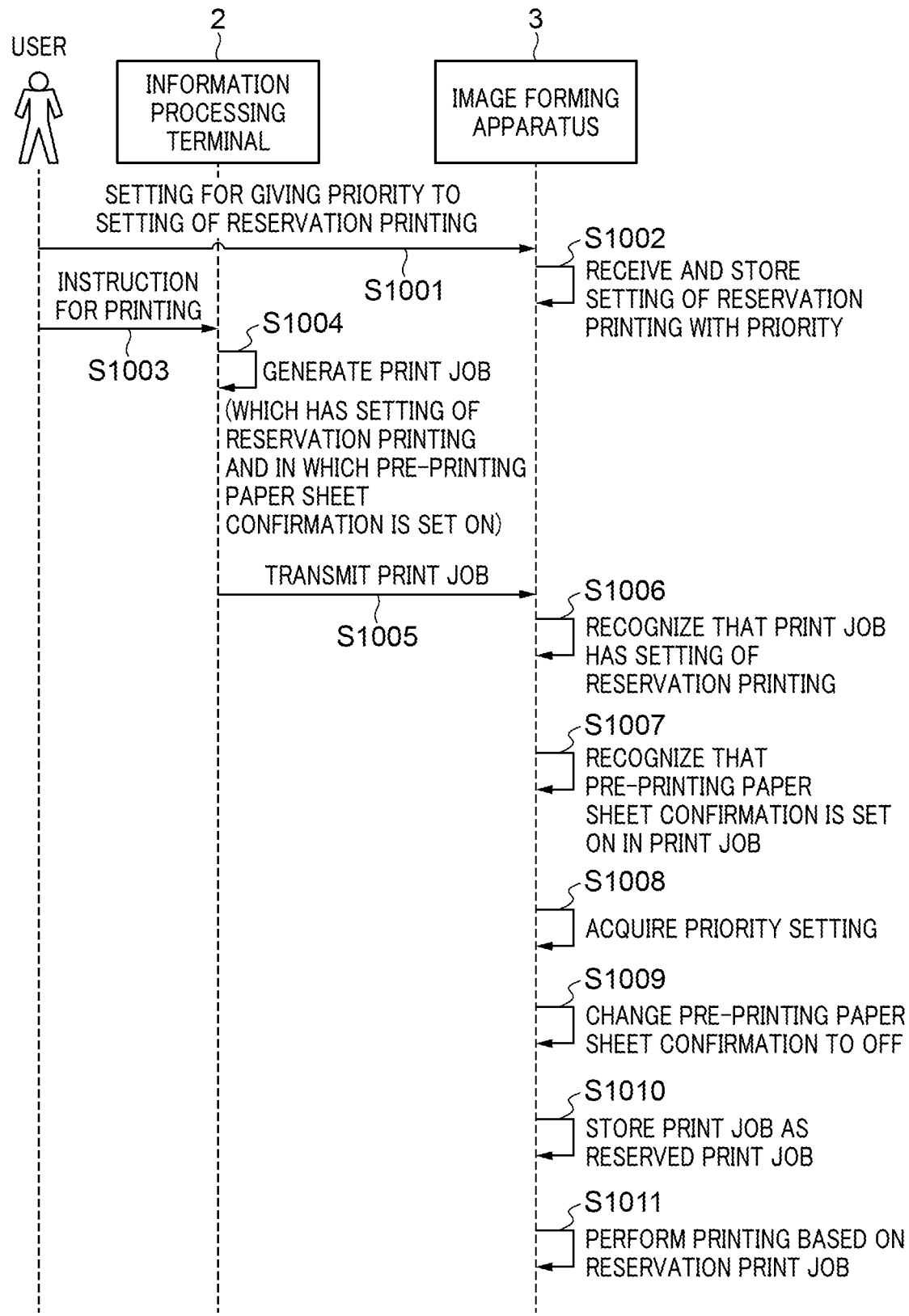
FIG. 19 is a sequence diagram showing one example of the entire system process in the image processing system.

FIG. 19 is a sequence diagram showing one example of the entire system process in the image processing system 1. In step S1001, the user performs, on the priority setting screen 90, setting for giving priority to setting of reservation printing, by operating the image forming apparatus 3. In step S1002, the image forming apparatus 3 receives and stores the setting for giving priority to setting of reservation printing. In step S1003, the user gives an instruction for printing at the information processing terminal 2. In step S1004, the information processing terminal 2 generates a print job 60. Here, the information processing terminal 2 generates a print job 60 which has setting of reservation printing and in which pre-printing paper sheet confirmation is set ON. In step S1005, the information processing terminal 2 transmits the generated print job 60 to the image forming apparatus 3.

In step S1006, the image forming apparatus 3 recognizes that the received print job 60 has setting of reservation printing, by analyzing the output method 63 in the print job 60. In step S1007, the image forming apparatus 3 recognizes that pre-printing paper sheet confirmation is set ON in the received print job 60. In step S1008, the image forming apparatus 3 acquires priority setting set through the priority setting screen 90, and recognizes that the acquired priority setting is setting for giving priority to setting of reservation printing. In step S1009, the image forming apparatus 3 changes the setting of pre-printing paper sheet confirmation to OFF (invalidation). In step S1010, the image forming apparatus 3 stores the received print job 60 as a reserved print job 60. In step S1011, when recognizing that a reservation time has come, the image forming apparatus 3 performs printing based on the stored reserved print job 60.

As described above, setting of reservation printing or setting of pre-printing paper sheet confirmation in the print job 60 transmitted to the image forming apparatus 3, is invalidated in accordance with the preset priority setting, and the printing process based on the print job 60 is performed. As described above, in the present embodiment, the order of giving priority between setting of reservation printing and setting of pre-printing paper sheet confirmation can be selectively set in the image forming apparatus 3. It should be noted that, in the present embodiment, the case where a print job 60 generated in the information processing terminal 2 is transmitted to the image forming apparatus 3, and the image forming apparatus 3 performs the process from reception of the print job 60 to printing, was described. However, all the process from generation of the print job 60 to printing may be performed in one apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium.

The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-016745, filed Feb. 1, 2018, which is hereby incorporated by reference wherein in its entirety.

What is claimed is:
1. An information processing apparatus comprising:
at least one processor configured to:
  generate a print job;
  generate a time request for starting printing of the print job at a specified time; and
  generate a print medium confirmation request for prompting a user to confirm a print medium at a time when printing based on the print job is started by an image forming apparatus,
  wherein the at least one processor is configured to perform a process in which the time request and the print medium confirmation request are mutually exclusively generated,
  wherein the print job is generated so as to include one of the generated time request or the generated print medium confirmation request,
  wherein a process corresponding to the time request or the print medium confirmation request included in the generated print job is performed prior to starting printing based on the generated print job, and
  wherein, in the case where the process is performed, the at least one processor is further configured to:
    prohibit generation of the print medium confirmation request in a case where the time request is generated;
    prohibit generation of the time request in a case where the print medium confirmation request is generated; and
    transmit the generated print job including one of the time request and the print medium confirmation request to the image forming apparatus that prints the print job.
2. An information processing apparatus configured to transmit a print command to a printer, the information processing apparatus comprising:
one or more processors configured to:
  cause a display to display a first object that enables a user to set use of a first function for the user to designate a date and time for printing; and
  cause the display to display a second object that enables the user to set use of a second function for requiring an operation, which is performed by the user via a user interface displayed on the printer, and which triggers printing,
  wherein the setting of the use of the first function causes the second object not to be displayed in a selectable manner,
  wherein in a case that a print instruction is issued while the second object has been selected without the first object having been selected, the apparatus transmits a print command not designating a date and time for printing by the printer, but including a request of the operation, and
  wherein in a case that a print instruction is issued while the first object has been selected without the second object having been selected, the apparatus transmits a print command designating the date and time for the printing, but not including the request of the operation.
3. The information processing apparatus according to claim 2, wherein the operation is to press a button indicating that the user has made a confirmation about a sheet type.

4. An information processing apparatus configured to transmit a print command to a printer, the information processing apparatus comprising:
  one or more processors configured to:
    cause a display to display a first object that enables a user to set use of a first function for the user to designate a date and time for printing; and
    cause the display to display a second object that enables the user to set use of a second function for requiring an operation, which is performed by the user via a user interface displayed on the printer, and which triggers printing,
    wherein the setting of use of the second function causes the first object not to be displayed in a selectable manner,
    wherein in a case that a print instruction is issued while the second object has been selected without the first object having been selected, the apparatus transmits a print command not designating a date and time for printing by the printer, but including a request of the operation, and
    wherein in a case that a print instruction is issued while the first object has been selected without the second object having been selected, the apparatus transmits a print command designating the date and time for the printing, but not including the request of the operation.

5. The information processing apparatus according to claim 4, wherein the operation is to press a button indicating that the user has made a confirmation about a sheet type.

* * * * *